United States Patent [19]

Misawa

[11] Patent Number: 5,757,749

[45] Date of Patent: May 26, 1998

[54] INFORMATION PROCESSING SYSTEM OPERABLE WITH A DETACHABLE RECORDING MEDIUM

[75] Inventor: Seiichi Misawa, Saitama, Japan

[73] Assignee: Sony Corporation, Tokyo, Japan

[21] Appl. No.: 884,041

[22] Filed: Jun. 27, 1997

Related U.S. Application Data

[63] Continuation of Ser. No. 405,086, Mar. 16, 1995, abandoned.

[30] Foreign Application Priority Data

Mar. 18, 1994 [JP] Japan ................... 6-074388

[51] Int. Cl.$^6$ .................................................. G11B 5/09
[52] U.S. Cl. .................................................. 369/47
[58] Field of Search .............................. 369/47, 53, 58

[56] References Cited

U.S. PATENT DOCUMENTS

| | | |
|---|---|---|
| 4,975,898 | 12/1990 | Yoshida . |
| 5,138,598 | 8/1992 | Sako et al. ................... 369/47 |
| 5,448,045 | 9/1995 | Clark ................... 235/382 |

OTHER PUBLICATIONS

Patent Abstracts of Japan, vol. 12, No. 226, JP 63-20 769 A (Sony Corp.), Jan. 28, 1988.

*Primary Examiner*—Emanuel T. Voeltz
*Assistant Examiner*—Peter J. Corcoran, III
*Attorney, Agent, or Firm*—Frommer Lawrence & Haug LLP; William S. Frommer

[57] ABSTRACT

An information processing system can have a portability of personal operation environment set information or the like to use an information processing apparatus and can also protect a copyright. A control command is transmitted from a CPU 11 to a system bus 18. An RAM 12, a non-volatile memory 13, a display 2, and an input/output control apparatus 15 are connected to the system bus 18. The system bus 18 and an I/O bus 19 are connected to the I/O control apparatus 15 and a signal of a control line is bidirectionally supplied to the I/O control apparatus 15. The I/O control apparatus 15, a keyboard 3, a mouse 4, an optical disc drive apparatus 5, and optional apparatuses 21 are connected to the I/O bus 19. The optional apparatuses 21 are constructed by a fixed magnetic recording apparatus 21a, a floppy disk drive 21b, a tape device 21c, and the like.

13 Claims, 7 Drawing Sheets

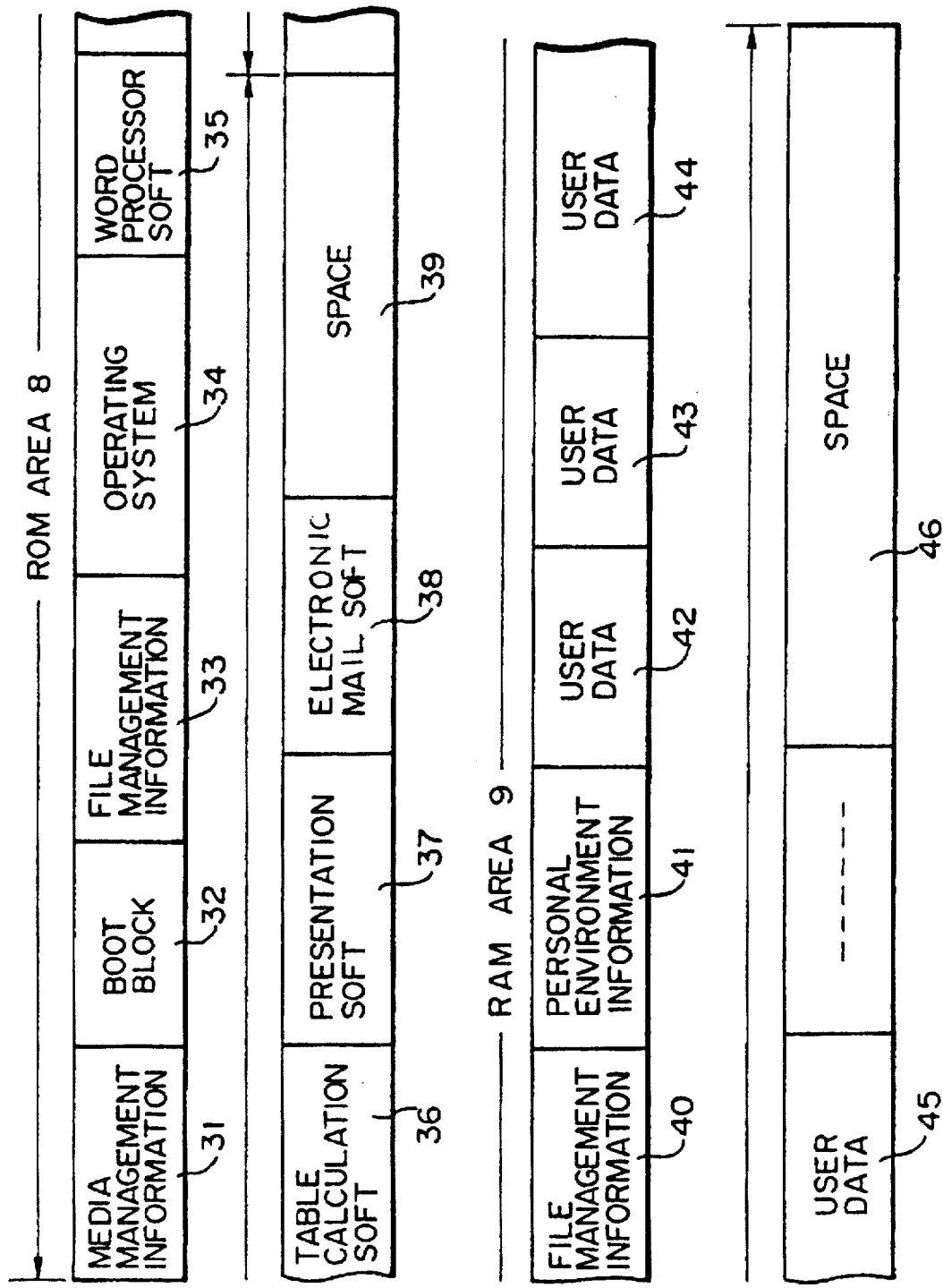

INFORMATION PROCESSING SYSTEM OPERABLE WITH A DETACHABLE RECORDING MEDIUM

This application is a continuation of application Ser. No. 08/405,086, filed Mar. 16, 1995, now abandoned.

BACKGROUND OF THE INVENTION

1. Field of the Invention

The present invention relates to an information processing system using a detachable recording medium such as an optical disc or the like.

2. Description of the Related Art

Hitherto, in an information processing system, an operating system (hereinbelow, referred to as an O/S), various kinds of application softwares (hereinbelow, referred to as APs), and the like serving as fundamental softwares necessary to use the information processing system are supplied by a floppy disk (hereinbelow, referred to as an FD), a CD-ROM, a tape medium, or the like.

The supplied O/S and AP are copied (hereinafter, referred to as "installed") to a fixed magnetic recording apparatus provided for the information processing system and, after that, they are read out so that the user can use the information processing system. Although the FD or CD-ROM can be used as it is, it is not practical in consideration of an accessing speed.

In the foregoing conventional information processing system, since the O/S, various APs, data files, personal operation environment set information, and the like are recorded in the fixed magnetic recording apparatus provided for the information processing system, it is possible to have a partial portability by using, for example, the FD or the like in order to use various APs. However, it is impossible to have a perfect portability including the personal operation environment set information and the like.

On the other hand, since the O/S, various APs, and the like cannot be used so long as they are not installed to the fixed magnetic recording apparatus provided for the information processing system, the user of the information processing system must perform advanced and complicated works and, further, it is difficult to protect copyrights of the installed softwares and the like.

OBJECTS AND SUMMARY OF THE INVENTION

It is, therefore, an object of the invention to provide an information processing system which allows each of an O/S, various APs, a data file, and personal operation environment set information to possess a portability and can easily use them without installing to a fixed magnetic recording apparatus and, further, can protect their copyrights.

According to the invention disclosed in claim 1, there is provided an information processing system comprising: an information processing apparatus having a central processing unit (CPU) and a memory; an input apparatus for supplying commands to the information processing apparatus; and an information recording and reproducing apparatus, connected to the information processing apparatus, for recording and reproducing information on the basis of commands which are supplied from the information processing apparatus to/from a detachable information recording medium having a writable area and a read only area in which at least boot information, operating system information, program information that is operated on the basis of the operating system information, and management information to manage the operating system information and program information have been recorded as files, wherein the information processing system is characterized in that the central processing unit of the information processing apparatus allows the recording and reproducing apparatus to reproduce the operating system information from the information recording medium and stores them into the memory on the basis of the boot information and also allows the program information to operate on the basis of the operating system information stored in the memory.

According to the invention disclosed in claim 11, there is provided an information recording medium having a writable area and a read only area, wherein at least boot information, operating system information, program information that is made operative on the basis of the operating system information, and management information to manage the operating system information and the program information have previously been recorded as a file in the read only area.

By using such an information processing system of the invention, the O/S, various APs, and the like are read out from the read only area and the data files, personal operation environment set information, and the like are read out from the writable area. That is, all of the information for using the information processing system can possess the portability.

The above and other objects and features of the present invention will become apparent from the following detailed description and the appended claims with reference to the accompanying drawings.

BRIEF DESCRIPTION OF THE DRAWINGS

FIG. 6 is a diagram showing an example of a file construction according to the invention;

DETAILED DESCRIPTION OF THE PREFERRED EMBODIMENT

Figure 1:
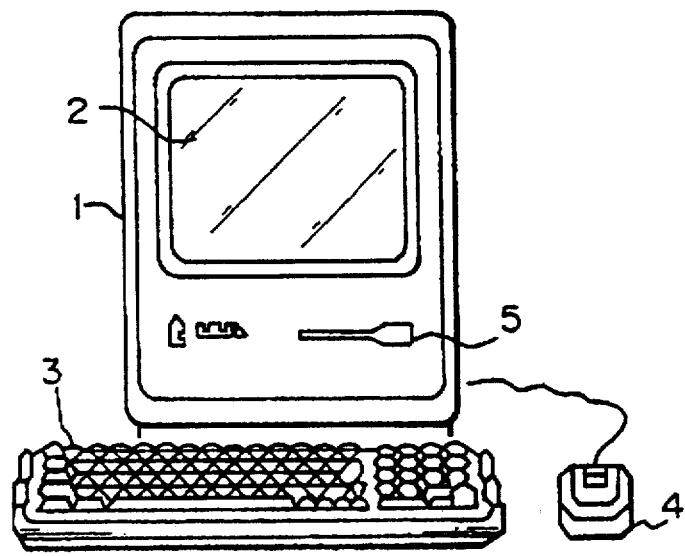
FIG. 1 is an external view of an embodiment of an information processing system of the invention.

An embodiment of the invention will now be described hereinbelow with reference to the drawings. FIG. 1 shows an external view of an information processing system of an embodiment of the invention. A display 2 is assembled in a personal computer (hereinbelow, referred to as a PC) 1 constructing such an information processing system. The display 2 performs a display or the like of a character corresponding to a code inputted from a keyboard 3. A mouse 4 shows a movable input device on two-dimensional coordinates in the display 2.

Figure 2:
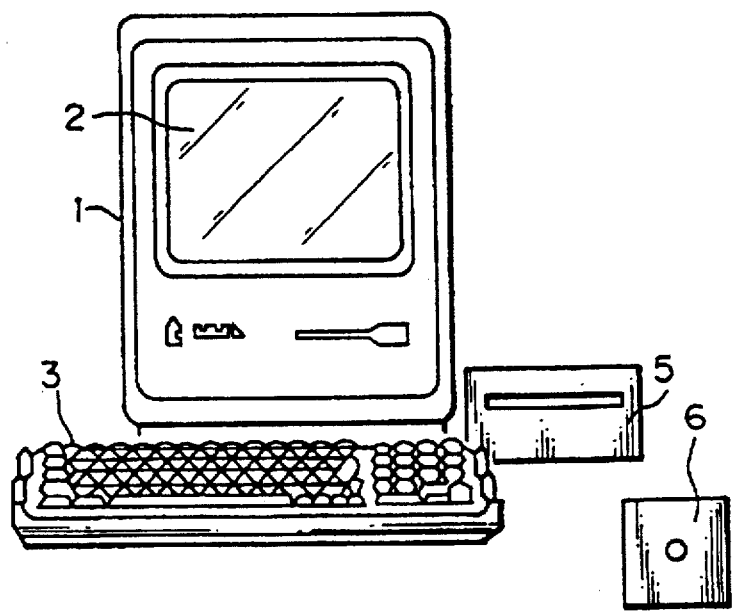
FIG. 2 is an external view of another embodiment of an information processing system of the invention.

An optical disc drive apparatus 5 can handle an optical disc having a writable area, which will be described hereinlater, and a read only area in which contents have previously been written (hereinbelow, simply referred to as an optical disc). As shown in FIG. 2, it is also possible that the optical disc drive apparatus 5 is connected to the outside and a cartridge 6 enclosing the optical disc therein is loaded into the optical disc drive apparatus 5.

Figure 3:
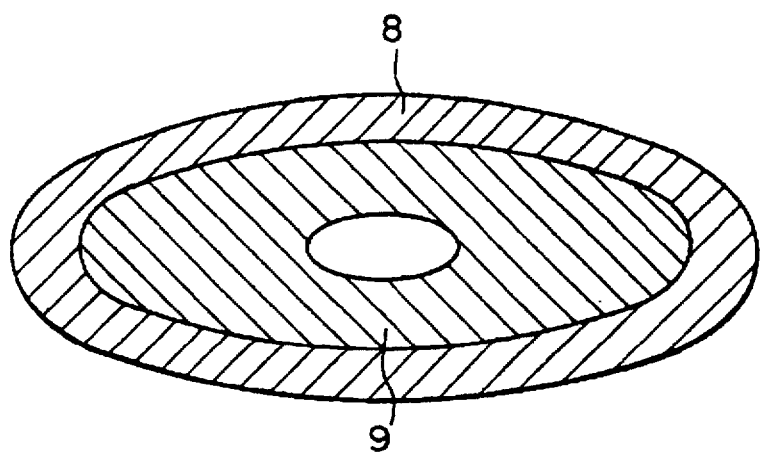
FIG. 3 is a constructional diagram of an example of a magnetooptic disk medium of the invention.

FIG. 3 shows an example of an optical disc which can be detachably loaded into/from the optical disc drive apparatus 5. In FIG. 3, a read only area (hereinbelow, referred to as an ROM area) 8 and a writable area (hereinafter, referred to as an RAM area) 9 are separately provided in the disc radial direction in the optical disc. For example, it is an optical disc having a diameter of 3.5 inches. The ROM area 8 is a geometrical-shaped area such as pit patterns in which information has previously been recorded. In the example, a magnetooptic disc such that a magnetooptic film is coated on a whole optical disc, namely, in the ROM area 8 and RAM area 9. In the embodiment, a capacity of one optical disc is set to 650 Mbytes and an area of one sector is set every 2048 bytes. Although the magnetooptic disc is used in the above example, it is also possible to use what is called a write once type optical disc in which a part of a memory area uses a phase change or the like.

O/S information and various APs which are necessary for using the information processing system have previously been written as pit patterns in the ROM area 8. The RAM area 9 is used for reading and writing of management information of the O/S, data files, personal operation environment set information, and the like. By using such an optical disc, the user can use the information processing system by merely inserting the optical disc into the optical disc drive apparatus 5. That is, the user can use the information processing system without installing.

On the other hand, since the optical disc can be easily carried, the O/S, various APs, data files, personal operation environment set information, and the like can be perfectly carried. When such an optical disc is inserted into the optical disc drive apparatus constructing another information processing system, an environment formed by using the optical disc can be realized by the another information processing system. Therefore, various kinds of information processing systems can be used without changing a use environment of the information processing system from an office to another office or from the office to the home.

Figure 4:
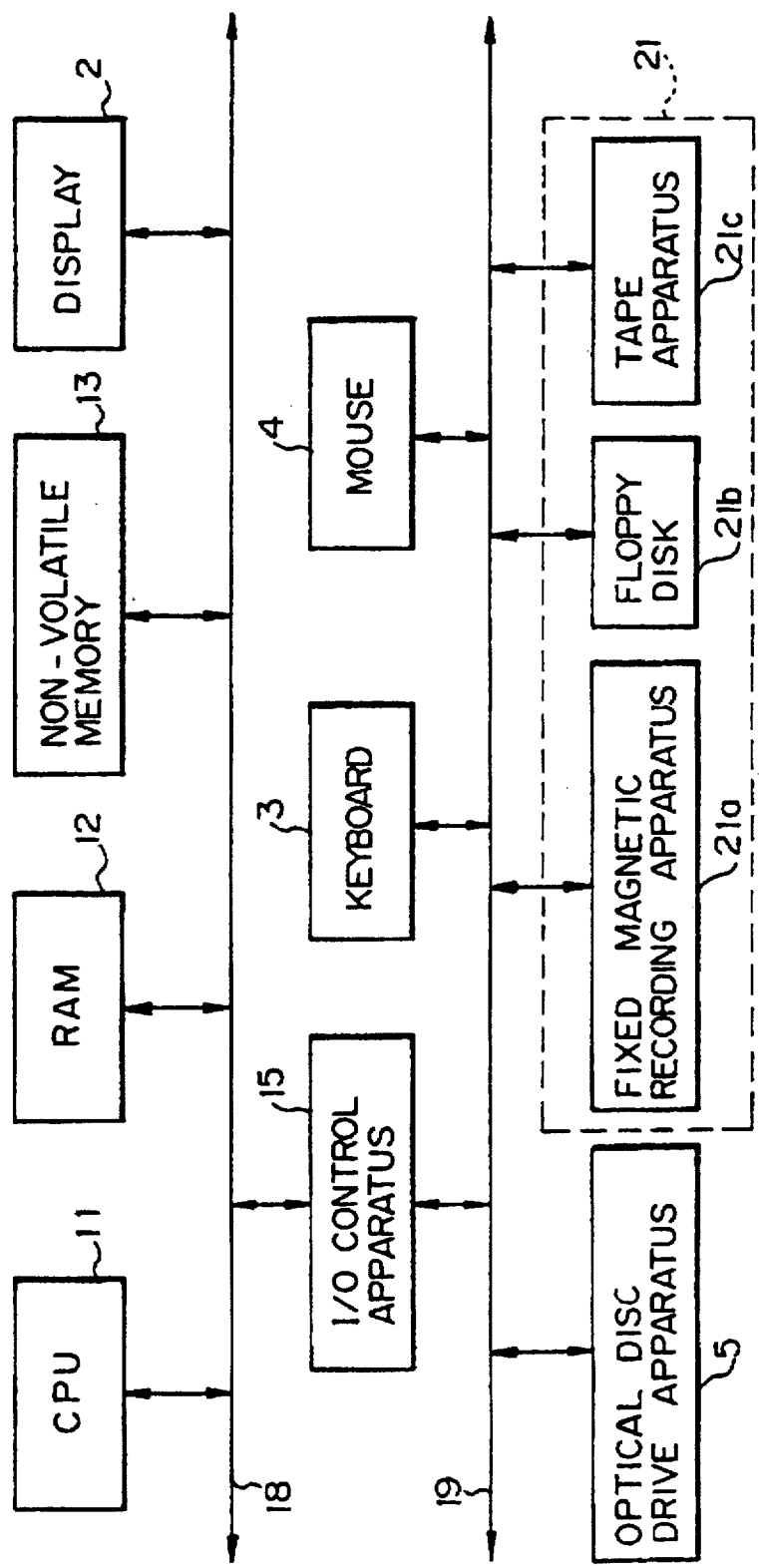
FIG. 4 is a block diagram of the information processing system as an example of the invention.

In FIG. 4, the same portions as those in FIGS. 1 and 2 are designated by the same reference numerals and their overlapped explanations are omitted. The PC 1 shown in FIGS. 1 and 2 comprises: a central processing unit (hereinbelow, referred to as a CPU) 11; an RAM 12; a non-volatile memory 13 to store time information or the like as a backup at the time of a power failure or the like; and an input/output control apparatus 15. The input/output control apparatus 15 is connected to a system bus 18 and an I/O bus 19 and supplies signals to the system bus 18 from the optical disc drive apparatus 5 connected to the I/O bus 19 and optional apparatuses 21 comprising a fixed magnetic recording apparatus 21a, a floppy disk drive 21b, a tape device 21c, and the like which are connected as optional apparatuses 21. The input/output control apparatus 15 also supplies signals from the PC 1 comprising the CPU 11, RAM 12, and non-volatile memory 13 and the display 2 which are connected to the system bus 18 to the I/O bus 19.

Figure 5:
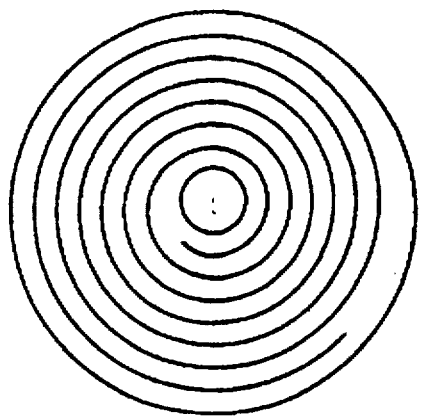
FIG. 5 is a diagram showing a recording state of data of an optical disc according to the invention.

In this instance, as shown in FIG. 5, data is spirally recorded on the optical disc. FIG. 6 shows an example of a file structure which is recorded on the optical disc. When largely classifying, the optical disc is constructed by the ROM area 8 and RAM area 9. Media management information 31, boot block information 32, file management information 33, O/S information 34, word processor software information 35, table calculation software information 36, presentation software information 37, and electronic mail software information 38 have been recorded in the ROM area 8. A space area 39 is provided in the ROM area 8. File management information 40, personal environment information 41, and user data 42, 43, 44, and 45 have been recorded in the RAM area 9. An area in which no data is recorded in the RAM area 9 is a space area 46.

The boot block information 32 is the information which is first read out when the personal computer executes an initialization (boot) and is also an initialization program to read out the subsequent O/S information 34 and is the program which is ordinarily called a "loader". As file management information 33, information regarding the file recorded in the ROM area 8, namely, the O/S information 34, word processor software information 35, and the like, for example, a directory, a file name, a size, a position on a medium, attributes, and the like are recorded every file.

The O/S information 34 is a fundamental program for executing an input/output management of the file and an execution management of the program and has functions similar to those of commercially available softwares called MS-DOS (registered trademark), Mac-OS (registered trademark), and the like. In the embodiment, the APs recorded in the optical disc cannot be used unless the O/S recorded in the same optical disc is used. That is, the APs such as word processor software information 35, table calculation software information 36, presentation software information 37, electronic mail software information 38, and the like are operated by only the O/S information 34. The space area 39 denotes an unrecorded area in the ROM area 8.

In a manner similar to the file management information 33, information with respect to the files recorded in the RAM area 9, for example, a directory, a file name, a size, a position on the medium, attributes, and the like are recorded as file management information 40 every file. The personal environment information 41 is the information corresponding to a user dictionary which is used at the time of a Katakana/Kanji conversion, for example, a word registration at the time of a spelling check, or the information corresponding to an automatic activation file (AUTOEXEC.BAT) and an environment set file (CONFIG.SYS) in the MS-DOS, the information corresponding to a control panel in the Mac-OS, or the like. The user data 42, 43, 44, 45 are the data files which were formed and preserved by the foregoing APs. The space area 46 denotes an unrecorded area in the RAM area 9.

Figure 7A:
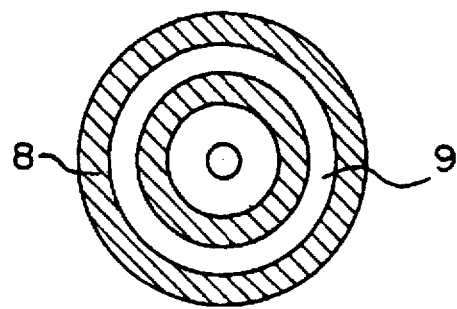
FIGS. 7A and 7B are diagrams each showing an example of an information area of the optical disc according to the invention.
Figure 7B:
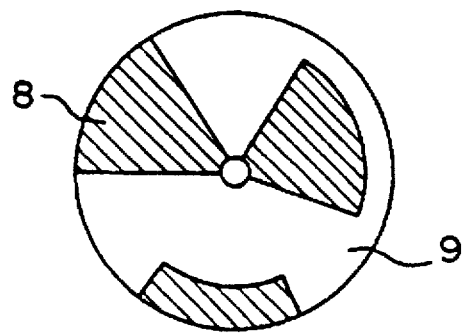

Although the files are constructed in the optical disc as mentioned above, such a construction is a mere example. As shown in FIG. 7A, the ROM area 8 and RAM area 9 can be also concentrically alternately arranged. As shown in FIG. 7B, the ROM area 8 and RAM area 9 can be also arranged as areas having arbitrary shapes.

The cartridge 6 enclosing the optical disc therein is inserted into the optical disc drive apparatus 5 and the PC 1 is activated. When the PC 1 is activated, the CPU 11 supplies a control signal to the optical disc drive apparatus 5 through the input/output control apparatus 15 and the above boot block information 32 is read out from the optical disc 6. The read-out boot block information 32 is stored into the RAM 12. The CPU 11 operates on the basis of the boot block information 32 stored in the RAM 12. Consequently, the CPU 11 supplies the control signal to the optical disc drive apparatus 5 and controls the optical disc drive apparatus 5 so as to read out the O/S information 34. The O/S information 34 read out from the optical disc by the optical disc drive apparatus 5 is stored into the RAM 12. Thus, the CPU 11 operates on the basis of the O/S information 34 stored in the RAM 12. That is, the operating system is activated and the subsequent processes are performed under the control of the O/S.

The O/S allows the personal environment information 41 to be read out on the basis of the file management information 40 in the RAM area 9 and sets a hardware construction and a software construction of the information processing system. In the case where there is no personal environment information 41 such as a case where the user purchases an optical disc and uses it for the first time or the like, a hardware construction and a software construction of the information processing system by initial values which have been prepared. The information processing system can be used by the above operations.

The data file which the user formed by using the APs such as word processor software information 35 and the like is written into the RAM area 9 on the basis of the file management information 40 in the RAM area 9 as user data 42 and the like. On the other hand, the user data and the like which have been formed before is similarly read out on the basis of the file management information 40 in the RAM area 9 and is written into the RAM 12 and is used. The personal environment information 41 set by the user is written into the RAM area 9 on the basis of the file management information 40 in the RAM area 9.

Figure 8:
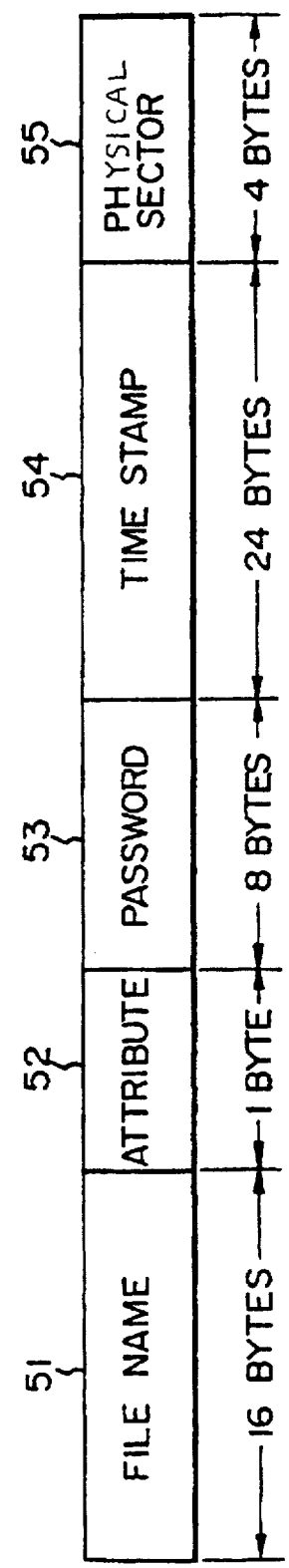
FIG. 8 is a diagram showing an example of file management data according to the invention.

The file management information 34 and 40 will now be described in detail with reference to FIG. 8. The file management data shown in FIG. 8 is provided for each file. Namely, the file management data shown in FIG. 8 is recorded for each file in the file management information 33 and 40 in FIG. 6. The file management data comprises: file name data 51 of 16 bytes; attribute data 52 of one byte; password data 53 of eight bytes; time stamp data 54 of 24 bytes; and physical sector address data 55 of four bytes.

When a bit 0 of the attribute data 52 is equal to "0", it indicates the user file. When the bit 0 is equal to "1", it indicates the system file. When a bit 1 of the attribute data 52 is equal to "0", it indicates the file. When the bit 1 is equal to "1", it indicates the directory. When a bit 2 of the attribute data 52 is equal to "0", it indicates <writable/erasable>. When the bit 2 is equal to "1", it indicates <unwritable/unerasable>. When a bit 3 of the attribute data 52 is equal to "0", it indicates <unexecutable>. When the bit 3 is equal to "1", it indicates <executable>. When a bit 4 of the attribute data 52 is equal to "0", it indicates <no password>. When the bit 4 is equal to "1", it indicates <password exists>. A bit 5 and a bit 6 of the attribute data 52 are not used at present and they are reserved for the future. When a bit 7 of the attribute data 52 is equal to "0", it indicates <copy permission>. When the bit 7 is equal to "1", it indicates <copy inhibition>.

As for the password data 53 consisting of eight bytes, a password can be set within eight bytes. "year, month, day, hour, minute, and second" at the time of forming or updating of the file is recorded in the time stamp data 54 consisting of 24 bytes. A head physical sector address of the file consisting of four bytes is recorded in the physical sector address data 55. As mentioned above, one file management data exists as file management information 33 and 40 in the ROM area 8 and RAM area 9 in correspondence to one file. Now, assuming that, for example, 1024 files exist on the disc, 1024 file management data exist.

Figure 9:
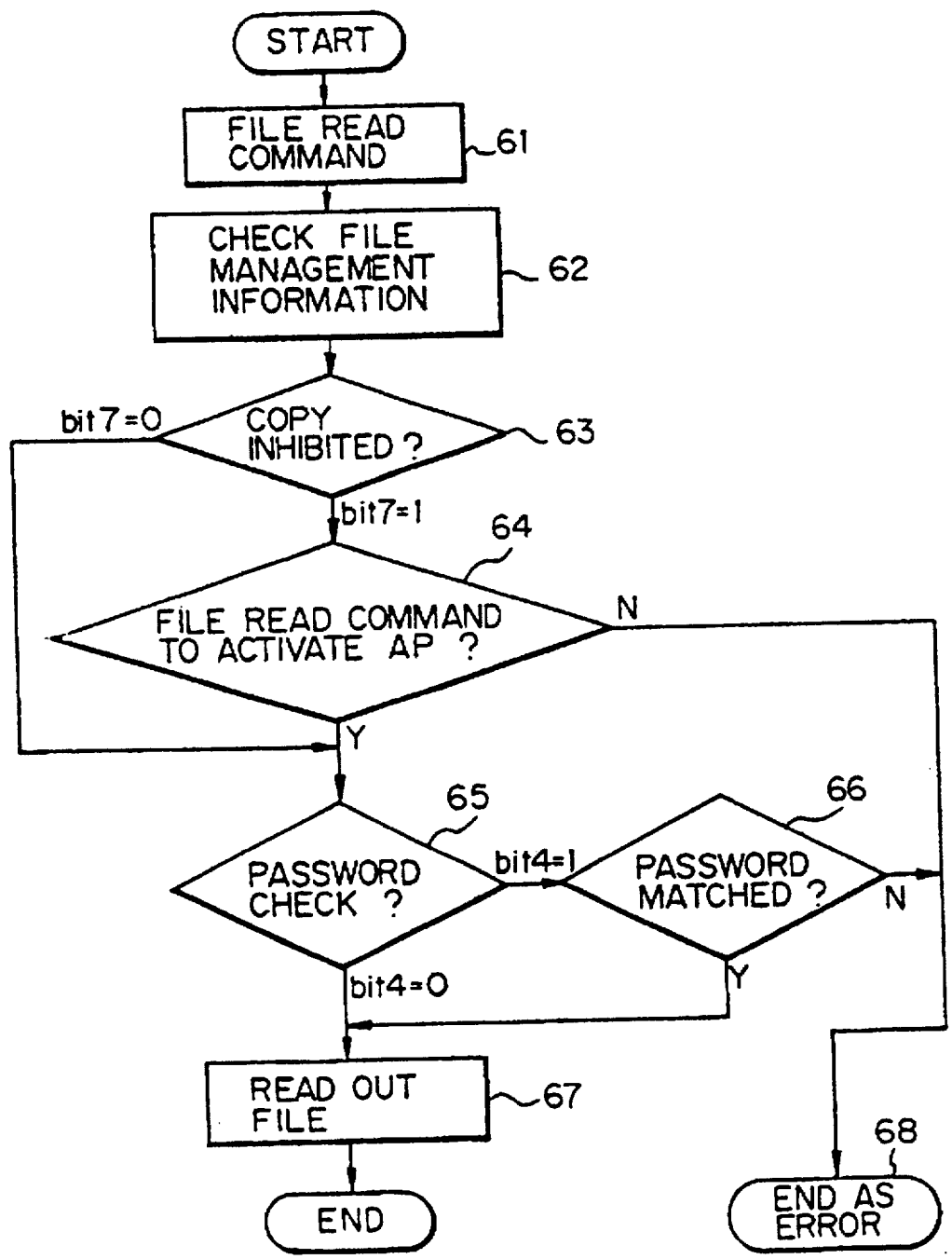
FIG. 9 is a flowchart of an example of a control for preventing an illegal copy according to the invention.

FIG. 9 shows an example of a flowchart for preventing the illegal copy. Processes in the flowchart are executed by the O/S. Namely, information to execute the flowchart has been recorded as a part of the O/S information 34 in the ROM area 8 of the optical disc. The flowchart to prevent the illegal copy starts from a file read command in step 61. In step 61, the read command of the file is instructed. When checking the file management information in step 62, the file management data regarding the file to which the read command was generated in the file management information is checked.

In step 63, a check is made to see whether the bit 7 of the attribute data 52 in the file management data to which was checked is equal to "0" or "1". When it is equal to "1", it denotes <copy inhibition> and the control is shifted to step 64. When "0", it indicates <copy permission> and the control is shifted to step 65. In step 64, a check is made to see whether the command is the file read command for the O/S to activate the AP or not. That is, a check is made to see whether it is the file read command to activate the word processor software information 35, table calculation software information 36, presentation software information 37, and electronic mail software information 38 in FIG. 6 or not.

In the case where it is not the file read command to activate the AP by the O/S, step 68 follows and the processing routine is finished as an error. At that time, a message such as "Since the copy of this file is inhibited, the instructed copy command is finished as abnormality." is displayed on the display 2. That is, since the bit 7 of the attribute data 52 of the corresponding file management data is set to "1", in case of a command other than the file read command for the O/S to activate the AP, namely, when the copy command is generated, the AP information such as word processor software information 35, table calculation software information 36, and the like recorded in the ROM area 8 are not read out from the optical disc. Consequently, it is possible to protect from the illegal copy. On the other hand, in the case where the bit 7 of the attribute data 52 is equal to '0' in step 63 or the command is the file read command for the O/S to activate the AP, in step 64, the control is shifted to step 65.

In case of a password check in step 65, a check is made to see whether the bit 4 of the attribute data 52 of the file management data is equal to "0" or "1". When "0", it is judged that there is no password, and the control is shifted to step 67. When "1", it is judged that there is a password, and the control is shifted to step 66. In step 66, when the inputted password coincides with the set password, the control is shifted to step 67. If the passwords don't coincide, the control is shifted to step 68 and the processing routine is ended as an error. When the file is read out in step 67, the file designated in step 61 is read out and the flowchart is ended.

Explanation will now be made with respect to the case where the illegal copy is prevented in the MS-DOS with reference to a specific example. In the MS-DOS, as shown hereinbelow, the command name indicative of one of the foregoing APs and an argument indicative of the file which is processed under the AP designated by the command name are inputted and a new line is started, thereby executing a process by the AP corresponding to the inputted command name in accordance with the argument.

For example, as a command for activating the LOTUS-1, 2, 3 (registered trademark), c/123 is inputted. When a new line is started, since "123" is a command name, the file in which the AP has been recorded is read out from the optical disc.

As a command for copying the LOTUS-1, 2, 3, c/copy 123.exe A: is inputted. When a new line is started, since "copy" is a command name, the file in which the AP has been recorded is read out from the optical disc. On the other hand, since "123.exe" is an argument, whether the file is read out from the optical disc or not is determined depending on whether the bit 7 of the attribute data 52 is equal to "0" or "1". In this instance, by setting all of the bits 7 of the attribute data 52 to "1", namely, by setting <copy inhibition> for an AP such as a LOTUS-1, 2, 3, the file of "123" is not read out from the optical disc. Therefore, the illegal copy can be prevented.

In this instance, the accessing speed of the optical disc and the accessing speed of the conventional fixed magnetic recording apparatus are compared as an example. An optical disc of 5.25 inches is used and a fixed magnetic recording apparatus of 80 Mbytes is used. As contents to be compared, the times until the APs (software for word processor, software for graphics) are activated and the copying of files are compared.

As for the time until the activation of the word processor software, it takes a time of 14 to 17 seconds in case of the optical disc and it takes a time of 12 to 14 seconds in case of the fixed magnetic recording apparatus. As for the time until the activation of the software for graphics, it takes a time of 5 to 7 seconds in case of the optical disc and it takes a time of 4 seconds in case of the fixed magnetic recording apparatus. With respect to the time to copy the file, it takes a time of 21 seconds in case of the optical disc and it takes a time of 11 seconds in case of the fixed magnetic recording apparatus. When considering quantitatively, although there is a difference of 1.5 times to 2 times or less in case of the accessing speed, such a difference doesn't cause a problem in a practical use.

In the embodiment, although the read only area has been arranged in the outermost rim of the optical disc, it is also possible to arrange the read only area to the innermost rim of the optical disc or to divide the read only area and writable area into a plurality of areas on the optical disc.

According to the invention, just after the user purchased a medium (disc) in which the O/S and main APs have previously been recorded (stamped) in the read only area, the medium can be soon used. Since the optical discs can be manufactured by stamping, the distribution costs of the APs can be reduced.

According to the invention, since the O/S, various APs, data file, personal operation environment set information, and the like are read out from the optical drive apparatus provided for the information processing system, all of them have the portability.

According to the invention, further, since there is no need to install the O/S and main APs to the fixed magnetic recording apparatus or the like and to use them, the illegal copy of those softwares can be prevented.

According to the invention, further, since the optical disc is used, data is hardly destroyed and a high security can be realized.

The present invention is not limited to the foregoing embodiment but many modifications and variations are possible within the spirit and scope of the appended claims of the invention.

I claim:

1. A system for processing information, comprising:

means for processing information having a central processing unit and a memory;

means for receiving a command and supplying said command to said means for processing;

a portable recording medium comprising a writable area and a read only area, said writable area adaptable for storing at least a user generated file and personal operation environment set information of a user, and said read only area having stored thereon as a file at least a boot program, an operating system, an application program which is made operative in response to said operating system, and management information for managing said operating system and said application program;

means for recording information on and reproducing information from said portable recording medium in response to said command received from said means for processing;

wherein said central processing unit of said means for processing controls said means for recording and reproducing to reproduce said operating system information from said portable recording medium and to store said operating system reproduced from said portable recording medium in said memory in response to said boot information and operates said application program in response to said operating system stored in said memory such that said system is operative from said portable recording medium without installing files from said portable recording medium to said system.

2. The system of claim 1, wherein said central processing unit is operable to control said means for recording and reproducing in response to said application program so as to record and reproduce said user generated file information from said writable area.

3. The system of claim 2, wherein said management information includes attribute data indicating whether each of said operating system and said application program is readable; wherein said means for receiving is operable to receive a command to reproduce a desired file from said portable recording medium; wherein said system further comprises means for detecting said attribute data corresponding to said desired file; and wherein said central processing unit is operable to control said means for recording and reproducing to reproduce said desired file from said portable recording medium if said detected attribute data indicates that said desired file is readable.

4. The system of claim 3, wherein said command comprises a command name and an argument annexed to said command name, said argument identifying a file stored in said portable recording medium; wherein said means for detecting is operable to detect said attribute data corresponding to said stored file identified by said argument; and wherein said central processing unit is operable to control said means for recording and reproducing to reproduce said stored file identified by said argument if said detected attribute data indicates that said desired file is readable.

5. A method of selectively inhibiting reproducing apparatus from reproducing a file stored in a recording medium having a writable area and a read only area, comprising the steps of:

providing in said read only area as a file at least a boot program, an operating system, an application program which is made operative in response to said operating system, and management information for managing said program information and including attribute data indicating whether each of said operating system and said application program is reproducible;

recording at least a user generated file onto said writable area;

receiving an input command comprising a command name corresponding to said application program and an argument annexed to said command name, said argument identifying a stored file;

detecting said attribute data of said management information for the stored file identified by said argument; and inhibiting said reproducing apparatus from reading the stored file identified by said argument from said recording medium if said detected attribute data indicates that the stored file identified by said argument is not reproducible.

6. The method of claim 5, wherein said attribute data further includes information indicating whether a password is required to reproduce said operating system and said application program.

7. A portable recording medium for use with an information processing system having a fixed hard disk, said portable recording medium comprising a writable area and a read only area, said writable area being adaptable for storing at least a user generated file and personal operation environment set information of a user, and said read only area having stored thereon as a file at least a boot program, an operating system, an application program which is made operative in response to said operating system, and management information for managing said operating system and said application program such that said information processing system is operative from said portable recording medium without installing files from said portable recording medium to said system.

8. The recording medium of claim 7, wherein said management information includes attribute data indicating whether each of said operating system and said application program is readable.

9. The recording medium of claim 8, wherein said attribute data further includes information indicating whether a password is required to read said operating system and said application program.

10. The recording medium of claim 8, wherein a stored file represents said operating system; wherein said management information further includes information indicating whether said stored file requested by a user is readable from said portable recording medium using a command comprising a command name and an argument annexed to said command name, said argument identifying said stored file; and wherein said stored file corresponding to said argument is not readable from said portable recording medium if said attribute data corresponding to said argument indicates that the stored file representing said operating system is not readable.

11. The recording medium of claim 8, wherein a stored file represents said application program; wherein said management information further includes information indicating whether said stored file requested by a user is readable from said portable recording medium using a command comprising a command name and an argument annexed to said command name, said argument identifying said stored file; and wherein said stored file corresponding to said argument is not readable from said portable recording medium if said attribute data corresponding to said argument indicates that the stored file representing said application program is not readable.

12. The recording medium according to claim 7, wherein said portable recording medium is a magneto-optic disc.

13. The recording medium according to claim 7, wherein said application program is made operative only in response to said operating system stored on said portable recording medium.

* * * * *